(12) United States Patent
Lee et al.

(10) Patent No.: US 11,609,474 B2
(45) Date of Patent: Mar. 21, 2023

(54) TERAHERTZ SIGNAL GENERATION APPARATUS AND TERAHERTZ SIGNAL GENERATION METHOD USING THE SAME

(71) Applicant: ELECTRONICS AND TELECOMMUNICATIONS RESEARCH INSTITUTE, Daejeon (KR)

(72) Inventors: Won Kyoung Lee, Daejeon (KR); Heuk Park, Daejeon (KR); Seung-Hyun Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/496,684

(22) Filed: Oct. 7, 2021

(65) Prior Publication Data

US 2022/0113606 A1    Apr. 14, 2022

(30) Foreign Application Priority Data

Oct. 8, 2020    (KR) .......................... 10-2020-0130057

(51) Int. Cl.
*G02F 1/21*    (2006.01)
*G02F 1/225*    (2006.01)
(Continued)

(52) U.S. Cl.
CPC .............. *G02F 1/212* (2021.01); *G02F 1/225* (2013.01); *H04B 10/114* (2013.01);
(Continued)

(58) Field of Classification Search
CPC ...... G02F 1/225; H04B 10/114; H04B 10/516
(Continued)

(56) References Cited

U.S. PATENT DOCUMENTS 8,155,534 B2    4/2012   Winzer
8,610,094 B2 *  12/2013  Kim .................... G02F 1/3534
                                                       250/493.1
9,761,750 B2    9/2017   Moon et al.
(Continued)

FOREIGN PATENT DOCUMENTS

CN    209281121 U  *  8/2019
JP    2018-097274 A    6/2018
(Continued)

OTHER PUBLICATIONS

Avik et al; On-chip dual-comb source for spectroscopy; Mar. 2018; Science.org; pp. 1-10 (Year: 2018).*
(Continued)

*Primary Examiner* — Amritbir K Sandhu
(74) *Attorney, Agent, or Firm* — LRK Patent Law Firm

(57) ABSTRACT

Disclosed are a terahertz signal generation apparatus and a terahertz signal generation method using the same. The terahertz signal generation apparatus includes first and second resonators configured to respectively output an optical signal of a first resonant frequency and an optical signal of a second resonant frequency from an optical signal input through a gain medium, an optical modulator configured to optically modulate the output optical signal of the second resonant frequency, an optical combiner configured to combine the CW optical signal of the first resonant frequency and the modulated optical signal of the second resonant frequency, and a signal generator configured to generate a terahertz signal using heterodyne beating between the CW optical signal of the first resonant frequency and the modulated optical signal of the second resonant frequency, wherein the first resonant frequency and the second resonant frequency are processed to have a predetermined frequency difference.

14 Claims, 8 Drawing Sheets

(51) Int. Cl.
  H04B 10/516 (2013.01)
  H04B 10/114 (2013.01)
(52) U.S. Cl.
  CPC ....... H04B 10/516 (2013.01); *G02F 2203/13* (2013.01); *G02F 2203/15* (2013.01); *G02F 2203/58* (2013.01)
(58) Field of Classification Search
  USPC .......................................................... 398/183
  See application file for complete search history.

(56) References Cited

U.S. PATENT DOCUMENTS

| | | | |
|---|---|---|---|
| 10,082,627 B2 | 9/2018 | Park et al. | |
| 2017/0090267 A1* | 3/2017 | O'Sullivan | H04B 10/516 |
| 2020/0401012 A1* | 12/2020 | Xu | G02F 1/353 |
| 2021/0152251 A1* | 5/2021 | Moon | H04B 10/506 |
| 2022/0113606 A1* | 4/2022 | Lee | G02F 1/212 |

FOREIGN PATENT DOCUMENTS

| | | | |
|---|---|---|---|
| KR | 10-2013-0073450 A | 7/2013 | |
| WO | WO-2019021282 A1 * | 1/2019 | ............... G02F 1/01 |

OTHER PUBLICATIONS

Donghyun Lee et al., "Design of Double Ring Resonator Add/Drop Filter Cascaded with Mach-Zehnder Interferometer", The Optical Society of Korea Summer Meeting 2007.
Pengbo Shen, "Analysis and Demonstration of a Fast Tunable Fiber-Ring-Based Optical Frequency Comb Generator", JLT, vol. 25, No. 11, 3257~3264p, 2007.
Scott A. Diddams, "Direct Link between Microwave and Optical Frequencies with a 300 THz Femtosecond Laser Comb", Physical Review Letters, vol. 84, No. 22, 5102~5105p, 2000.
Avik Dutt et al., "On-chip dual-comb source for spectroscopy", Science Advances, Mar. 2, 2018.

* cited by examiner

TERAHERTZ SIGNAL GENERATION APPARATUS AND TERAHERTZ SIGNAL GENERATION METHOD USING THE SAME

CROSS-REFERENCE TO RELATED APPLICATION

This application claims the benefit of Korean Patent Application No. 10-2020-0130057 filed on Oct. 8, 2020, in the Korean Intellectual Property Office, the entire disclosure of which is incorporated herein by reference for all purposes.

BACKGROUND

1. Field of the Invention

One or more example embodiments relate to a terahertz signal generation apparatus for broadband wireless communications and a terahertz signal generation method using the same.

2. Description of Related Art

With the development of broadband millimeter-wave wireless communications, there is a growing demand for mobile data in a 5G network environment and for carrier frequency bandwidths. In particular, in recent years, photonics-based wireless communication technology with high data transmission rates, strong physical security, and low influence of electromagnetic interference has been in the spotlight. Specifically, research to use a terahertz (THz) frequency band for electromagnetic wave wireless communications is being studied as a new paradigm. Here, the terahertz frequency band corresponds to a bandwidth of 0.1 THz to 10 THz, which is between the existing radio bandwidth and optical communication bandwidth.

A terahertz signal generation method based on an electronic device (Schottky) such as a high-electron-mobility transistor (HEMT) has a relatively low signal quality (signal-to-noise ratio) and a relatively narrow bandwidth due to a loss in the atmosphere caused by water vapors, a spatial path loss, and an intrinsic loss of a material.

With the recent development of high-power photodiode technology, a photonics-based terahertz signal generation method is emerging as more useful technology. Such silicon photonics integration-based terahertz signal generation and detection technology is a highly advanced technology implemented by fusion of electronics and photonics technology.

However, the existing board-level photonics-based terahertz signal generation and detection technology have issues such as performance degradation according to misalignment, large size, and decrease of price competitiveness due to small-volume production.

In addition, the existing photonics-based integrated terahertz signal generation and detection technology has a considerably large coupling loss to a device and a difficulty in adjusting parameters of the device. Thus, it exhibits a rather poorer performance than the board-level photonics-based terahertz signal generation and detection technology.

SUMMARY

Example embodiments provide an apparatus and method for improving the quality of broadband terahertz wireless communications by improving and providing a silicon photonics integrated terahertz signal generation method at compact size of a chip level.

According to an aspect, there is provided a terahertz signal generation apparatus including first and second resonators configured to respectively output an optical signal of a first resonant frequency and an optical signal of a second resonant frequency from an optical signal input through one gain medium or more, an optical modulator configured to optically modulate the output optical signal of the second resonant frequency, an optical combiner configured to combine the continuous-wave (CW) optical signal of the first resonant frequency and the modulated optical signal of the second resonant frequency, and a signal generator configured to generate a terahertz signal using a heterodyne beating between the CW optical signal of the first resonant frequency and the modulated optical signal of the second resonant frequency, wherein the first resonant frequency and the second resonant frequency may be processed to have a predetermined frequency difference.

Each of the first and second resonators may include a ring waveguide and a bus waveguide connected to the ring waveguide, and the ring waveguide included in each of the first and second resonators may have an effective refractive index and a radius that are adjusted according to a resonant frequency of an optical signal.

Each of the first and second resonators may further include a microheater, and center frequency values of optical signals from the ring waveguide may be finely adjusted through the microheater.

The light modulator may be in a dual-parallel Mach-Zehnder interferometer structure, and a phase difference between an I-channel (in-phase) signal and a Q-channel (quadrature) signal, which are outputs from the dual-parallel Mach-Zehnder interferometer structure, may be monitored through a tap connected to a rear end of the dual-parallel Mach-Zehnder interferometer structure.

The light modulator may include a phase shifter at a rear end of any one Mach-Zehnder interferometer in the dual-parallel Mach-Zehnder interferometer structure, and the phase shifter may be controlled such that the phase difference between the I-channel (in-phase) signal and the Q-channel (quadrature) signal monitored through the tap is 90 degrees.

The optical combiner may have a nonlinear tapered structure in the form of a parabolic or Gaussian curve.

According to an aspect, there is provided a terahertz signal generation apparatus including first and second fiber-optic couplers configured to respectively receive an optical signal of a first resonant frequency and an optical signal of a second resonant frequency through two different light sources, an optical modulator configured to optically modulate the optical signal of the second resonant frequency received through the second fiber-optic coupler, an optical combiner configured to combine the CW optical signal of the first resonant frequency received through the first fiber-optic coupler and the modulated optical signal of the second resonant frequency, and a signal generator configured to generate a terahertz signal using heterodyne beating between the CW optical signal of the first resonant frequency and the modulated optical signal of the second resonant frequency, wherein the two different light sources may be monitored such that the optical signal of the first resonant frequency and the optical signal of the second resonant frequency may be in phase through a phase locking device.

Each of the first and second fiber-optic couplers may have a chirping grating structure in which a grating interval is changed according to a distance.

The light modulator may be in a dual-parallel Mach-Zehnder interferometer structure, and a phase difference between an I-channel (in-phase) signal and a Q-channel (quadrature) signal, which are outputs from the dual-parallel Mach-Zehnder interferometer structure, may be monitored through a tap connected to a rear end of the dual-parallel Mach-Zehnder interferometer structure.

The light modulator may include a phase shifter at a rear end of any one Mach-Zehnder interferometer in the dual-parallel Mach-Zehnder interferometer structure, and the phase shifter may be controlled such that the phase difference between the I-channel (in-phase) signal and the Q-channel (quadrature) signal monitored through the tap is 90 degrees.

The optical combiner may have a nonlinear tapered structure in the form of a parabolic or Gaussian curve.

According to an aspect, there is provided a terahertz signal generation method including outputting an optical signal of a first resonant frequency and an optical signal of a second resonant frequency from an optical signal input through a gain medium, optically modulating the output optical signal of the second resonant frequency, combining the output optical signal of the first resonant frequency and the modulated optical signal of the second resonant frequency, and generating a terahertz signal using heterodyne beating between the CW optical signal of the first resonant frequency and the modulated optical signal of the second resonant frequency, wherein the first resonant frequency and the second resonant frequency may be processed to have a predetermined frequency difference.

The outputting may include outputting the optical signal of the first resonant frequency and the optical signal of the second resonant frequency through first and second resonators each including a ring waveguide and a bus waveguide connected to the ring waveguide, and the ring waveguide included in each of the first and second resonators may have an effective refractive index and a radius that are adjusted according to a resonant frequency of an optical signal to be generated.

Each of the first and second resonators may further include a microheater, and center frequency values of optical signals output through the ring waveguide may be finely adjusted through the microheater.

The optically modulating may include monitoring a phase difference between an I-channel (in-phase) signal and a Q-channel (quadrature) signal, which are outputs from a dual-parallel Mach-Zehnder interferometer structure, through a tap connected to a rear end of the dual-parallel Mach-Zehnder interferometer structure in an optical modulator provided in the dual-parallel Mach-Zehnder interferometer structure.

The light modulator may include a phase shifter at a rear end of any one Mach-Zehnder interferometer in the dual-parallel Mach-Zehnder interferometer structure, and the phase shifter may be controlled such that the phase difference between the I-channel (in-phase) signal and the Q-channel (quadrature) signal monitored through the tap is 90 degrees.

According to an aspect, there is provided a terahertz signal generation method including respectively receiving an optical signal of a first resonant frequency and an optical signal of a second resonant frequency through two different light sources, optically modulating the optical signal of the second resonant frequency received through the second fiber-optic coupler, combining the optical signal of the first resonant frequency received through the first fiber-optic coupler and the modulated optical signal of the second resonant frequency, and generating a terahertz signal using a result of combining the received optical signal of the first resonant frequency and the modulated optical signal of the second resonant frequency, wherein the two different light sources may be monitored such that the optical signal of the first resonant frequency and the optical signal of the second resonant frequency are in phase through a phase locking device.

The receiving may include respectively receiving the optical signal of the first resonant frequency and the optical signal of the second resonant frequency from the two different light sources through first and second fiber-optic couplers, and each of the first and second fiber-optic couplers may have a chirping grating structure in which a grating interval is changed according to a distance.

The optically modulating may include monitoring a phase difference between an I-channel (in-phase) signal and a Q-channel (quadrature) signal, which are outputs from a dual-parallel Mach-Zehnder interferometer structure, through a tap connected to a rear end of the dual-parallel Mach-Zehnder interferometer structure in an optical modulator provided in the dual-parallel Mach-Zehnder interferometer structure.

The combining may include combining the CW optical signal of the first resonant frequency and the modulated optical signal of the second resonant frequency through a nonlinear tapered structure in the form of a parabolic or Gaussian curve.

Additional aspects of example embodiments will be set forth in part in the description which follows and, in part, will be apparent from the description, or may be learned by practice of the disclosure.

According to example embodiments, a terahertz signal generation apparatus may generate a terahertz signal with a variable frequency to which optical heterodyne technology is applied based on silicon photonics integration and thus, need no expensive electronic element or high-performance comb generator, be simply structured, and be produced in mass, and thus have price competitiveness.

Further, the terahertz signal generation apparatus may integrate phase-locked light sources of two wavelengths having no phase difference using an external cavity dual ring resonator structure, thereby reducing phase noise and improving transmission performance.

In addition, the terahertz signal generation apparatus may integrate an in-phase/quadrature modulator with a high extinction ratio and a high modulation efficiency using a dual-parallel Mach-Zehnder interferometer structure embedded with a tap, thereby enabling high-speed wireless data transmission.

Therefore, the terahertz signal generation apparatus may solve the limitations of the existing optical heterodyne-based integrated terahertz signal generation apparatus, such as phase noise, a coupling loss, and difficult IQ modulation phase control, thereby improving the loss and modulation performance and further improving wireless transmission performance.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
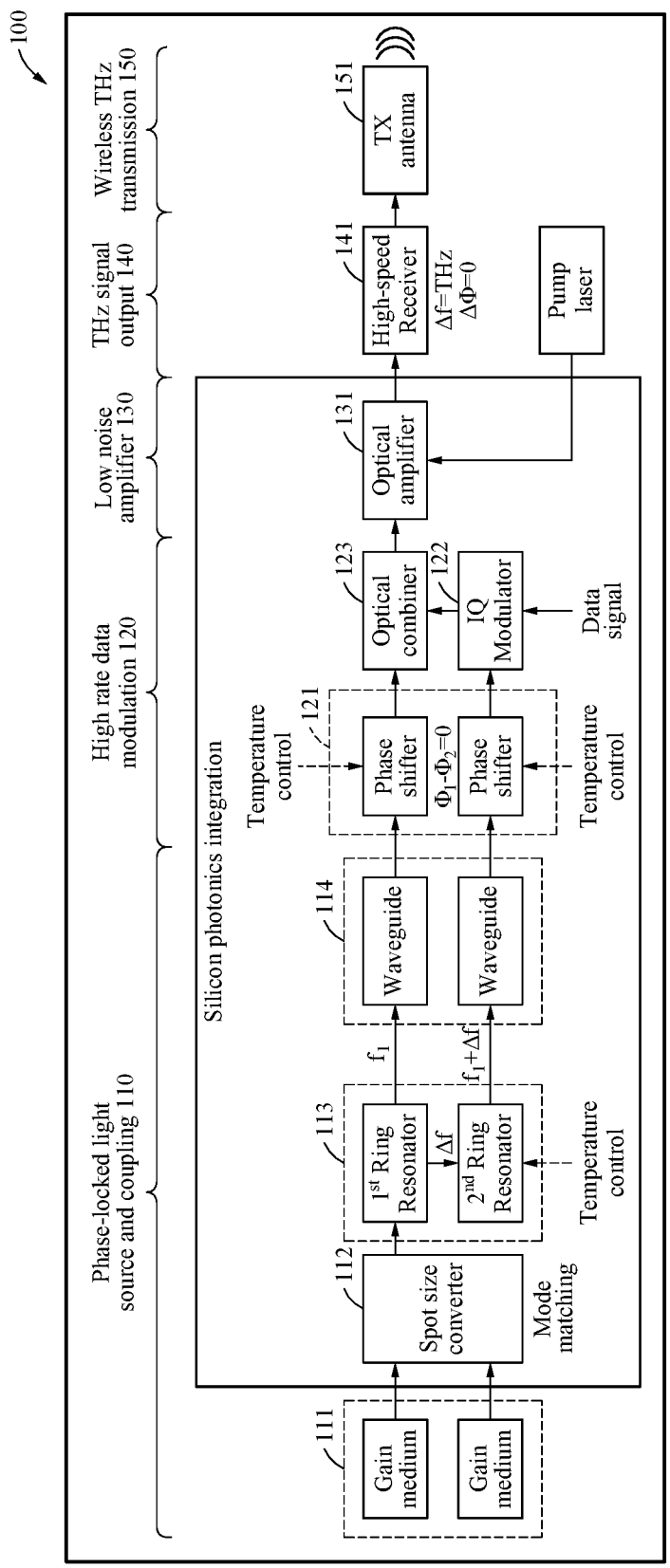
FIG. 1 illustrates a structure of a silicon photonics integration-based terahertz signal generation apparatus according to an example embodiment.

FIG. 1 illustrates a structure of a silicon photonics integration-based terahertz signal generation apparatus according to an example embodiment.

The present disclosure may provide a silicon photonics integration-based terahertz signal generation apparatus 100 that is simple, has low phase noise, and has excellent frequency stability and a terahertz signal generation method using the same through optical heterodyne technology using two optical signals with different frequencies.

First, the silicon photonics integration-based terahertz signal generation apparatus 100 for wireless transmission may include a phase-locked light source and low-loss coupling unit 110, a high rate data modulation unit 120, a low noise amplifier 130, a terahertz signal output unit 140, and a wireless THz transmission unit 150.

More specifically, the phase-locked light source and low-loss coupling unit 110 may include gain media 111, a spot size converter 112, ring resonators 113, and optical waveguides 114. To solve the issues of a low frequency stability of a terahertz signal resulting from the instability of a frequency interval between two optical signals with different frequencies and a low spectral resolution resulting from phase noise, the phase-locked light source and low-loss coupling unit 110 may cause two optical signals to be in phase by integration to a structure of the resonators 113 of an external cavity dual ring resonator structure, thereby solving the issue of performance degraded by phase noise in a board-level terahertz signal generation method or in an existing terahertz signal generation method that directly integrates two light sources.

First, the phase-locked light source and low-loss coupling unit 110 may increase an output of resonant light by coupling a reflective mirror to one face of one or more gain media 111 such as a semiconductor optical amplifier (SOA), and output two optical signals having a predetermined frequency difference for terahertz signal generation through the resonators 113 of the external cavity dual ring resonator structure. At this time, the phase-locked light source and low-loss coupling unit 110 may include the spot size converter 112 arranged between the gain media 111 and the resonators 113 to minimize a mode loss caused by a size difference between output ports of the gain media 111 and input ports of the resonators 113. In this case, the spot size converter may reduce abrupt mode conversion by using a nonlinear taper structure and minimize a coupling loss by performing gradual mode conversion. In addition, the phase-locked light source and low-loss coupling unit 110 may transmit the two optical signals with the predetermined frequency difference output in this manner to the high rate data modulation unit 120 using the optical waveguides 114.

The high rate data modulation unit 120 may include phase shifters 121, an optical modulator 122, and an optical combiner 123. The high rate data modulation unit 120 may use the phase shifters 121 to alleviate a chip manufacturing tolerance by removing a phase difference occurring while the two optical signals output from the resonators 113 of the dual ring resonator structure pass through the optical waveguides 114 due to limitations in the manufacturing process. The phase shifters 121 may compensate for the phase difference by controlling a thermo-optic coefficient by changing an electrode temperature.

In addition, the high rate data modulation unit 120 may optically modulate any one of the two optical signals with the predetermined frequency difference through the optical modulator 122 provided in a dual-parallel Mach-Zehnder interferometer structure, and then optically combine the other CW optical signal with the modulated optical signal through the optical combiner 123 of a multimode interface (MMI) coupler structure. The dual-parallel Mach-Zehnder interferometer structure may provide a means for controlling a phase difference between an I channel and a Q channel to be precisely 90 degrees by real-time monitoring, thereby solving an IQ modulation parameter optimization issue, which was the big issue of the existing integration-based terahertz signal generator.

When the signal output from the optical combiner 123 of the MMI coupler structure is very small, the low noise amplifier 130 may amplify the intensity of the signal through an integrated optical amplifier 131. The integration of the low noise amplifier eliminates the need for a complex amplification structure of the board-level terahertz signal generator and additional devices for the amplifier such as a polarization controller and a coupler.

The terahertz signal output unit 140 may generate a high-power terahertz signal from the two optical signals with the predetermined frequency difference amplified through the low noise amplifier 130 using a high-speed receiver 141 that is a signal generator. As the high-speed receiver 141 for generating the high-power terahertz signal, a Schottky barrier diode (SBD) or a photomixer may be used.

Also, a uni-traveling-carrier photodiode (UTC-PD) may be used to increase the output at high speed. A Pin-PD that generates an electron-hole pair as light is incident to an incident layer may have a maximum operating speed limited by a hole velocity. In contrast, a UTC-PD allows only electrons to flow through a carrier collection layer and thus has a maximum operating speed determined by an electron speed, and a high saturation output current and a fast-operating speed.

Finally, the wireless THz transmission unit 150 may send the high-power terahertz signal generated through the terahertz signal output unit 140 to free space through a transmission antenna 151 and a lens (not shown). In this case, the transmission antenna 151 and the lens may perform a focusing and emission function for a terahertz wave.

Figure 2:
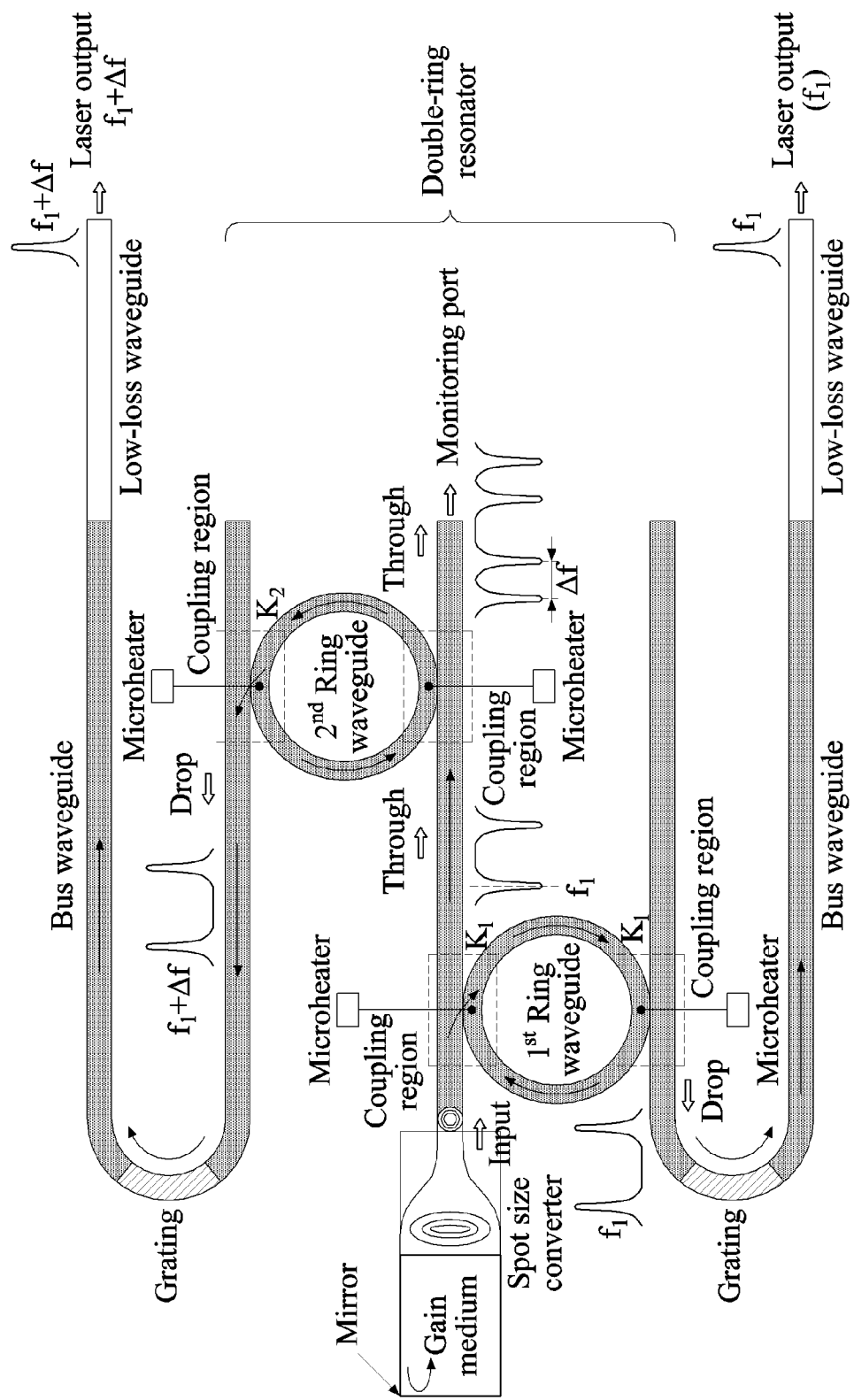
FIG. 2 illustrates a phase-locked light source and coupling unit using an external cavity dual ring resonator structure without phase noise according to an example embodiment.

FIG. 2 illustrates a phase-locked light source and coupling unit using an external cavity dual ring resonator structure according to an example embodiment.

When two external lasers are used, a separate phase locking circuit for phase matching is needed. However, the phase-locked light source and low-loss coupling unit 110 may generate optical signals of two wavelengths having no phase difference at a predetermined frequency interval, by adjusting coupling coefficients $K_1$ and $K_2$ of the resonators 113 having a silicon photonics integration-based external cavity dual ring resonator structure using a spectrum shift by heat from heaters. That is, the phase-locked light source and low-loss coupling unit 110 may adjust the coupling coefficients by changing the effective refractive index and the radius of the ring waveguides such that a signal incident through the spot size converter 112 has a resonant frequency $f_1$ through the first ring waveguide. In this case, the coupling coefficients may be determined by Equation 1 below.

[Equation 1]

$$v_m = m \cdot FSR_v$$
$$FSR_v = \frac{c}{2n_g \pi R}$$
$$FSR_\lambda = \frac{\lambda^2}{n_g 2\pi R}$$
$$n_g(\lambda) = n_e(\lambda) - \frac{\partial n_e}{\partial \lambda} \lambda$$

Here, $v_m$ denotes the resonant frequency corresponding to a mode, and m denotes an order of the mode. FSR standing for free spectral range is a parameter that affects significant characteristics (channel selection efficiency, extinction ratio, and insertion loss) of a filter needed to form a resonator-based light source at an interval of wavelengths or optical frequencies between at most or at least two consecutive reflected or transmitted signals in an interferometer, and is a function for a group refractive index $n_g$ and the radius R of the ring waveguides. The group refractive index considers a part of the wavelength dependence of the effective refractive index. The optical signal of the resonant frequency $f_1$ output from the first ring waveguide to a drop port may be output to have a narrower linewidth while passing through a grating. In this case, a value of a center frequency $f_1$ may be adjusted by a spectrum shift by heat from a microheater attached to the first ring waveguide.

In the first ring waveguide, the optical signal of the resonant frequency $f_1$ may be dropped to the drop port, and the remaining spectral signal may be transmitted to the second ring waveguide through a through port. The effective refractive index and the radius of the second ring waveguide may be adjusted such that a frequency corresponding to $f_1+\Delta f$ is the resonant frequency. In this case, the value of $\Delta f$ may be adjusted by controlling a microheater of the second ring waveguide. The optical signal corresponding to the resonant frequency $f_1+\Delta f$ of the second ring waveguide may be output by a drop port. In this case, the optical signal of the resonant frequency $f_1+\Delta f$ output from the second ring waveguide to the drop port may be output to have a narrower linewidth while passing through a grating.

In addition, the phase-locked light source and low-loss coupling unit 110 may easily control the resonant frequencies output through the external cavity dual ring resonator structure by monitoring the spectral signal, in which the optical signals of the two resonant frequencies are filtered out, output through a through port of the second ring waveguide. That is, the two resonant frequencies may be calculated (1-R) by connecting the through port of the second ring waveguide to an external spectrum analyzer (OSA) and measuring the spectrum of the output signal R, and the resonant frequencies may be controlled more accurately by adjusting the temperature of the microheaters while monitoring this.

In the phase-locked light source and low-loss coupling unit 110 having the external dual ring resonator structure proposed herein, one or more gain media 111 may be coupled and input optical signals through the spot size converter 112. In the resonators 113, an output signal of a first resonant frequency may be output from the first ring waveguide, and an optical signal having a second resonant frequency that is away by THz from the first resonant frequency may be output from the second ring waveguide, whereby a phase noise issue caused by a phase difference between the two optical signals may be solved. In addition, the phase-locked light source and low-loss coupling unit 110 may obtain an optical signal having a narrow linewidth by means of the resonance ring structure and grating.

Figure 3:
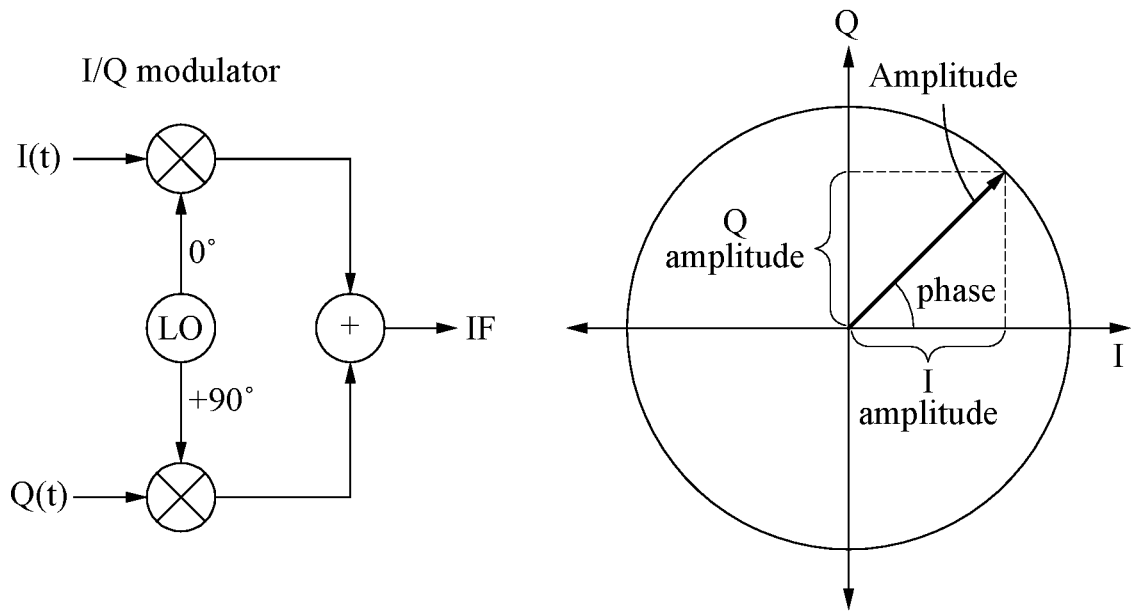
FIG. 3 illustrates high-speed data transmission using an IQ (in-phase quadrature) optical modulator according to an example embodiment.
Figure 4:
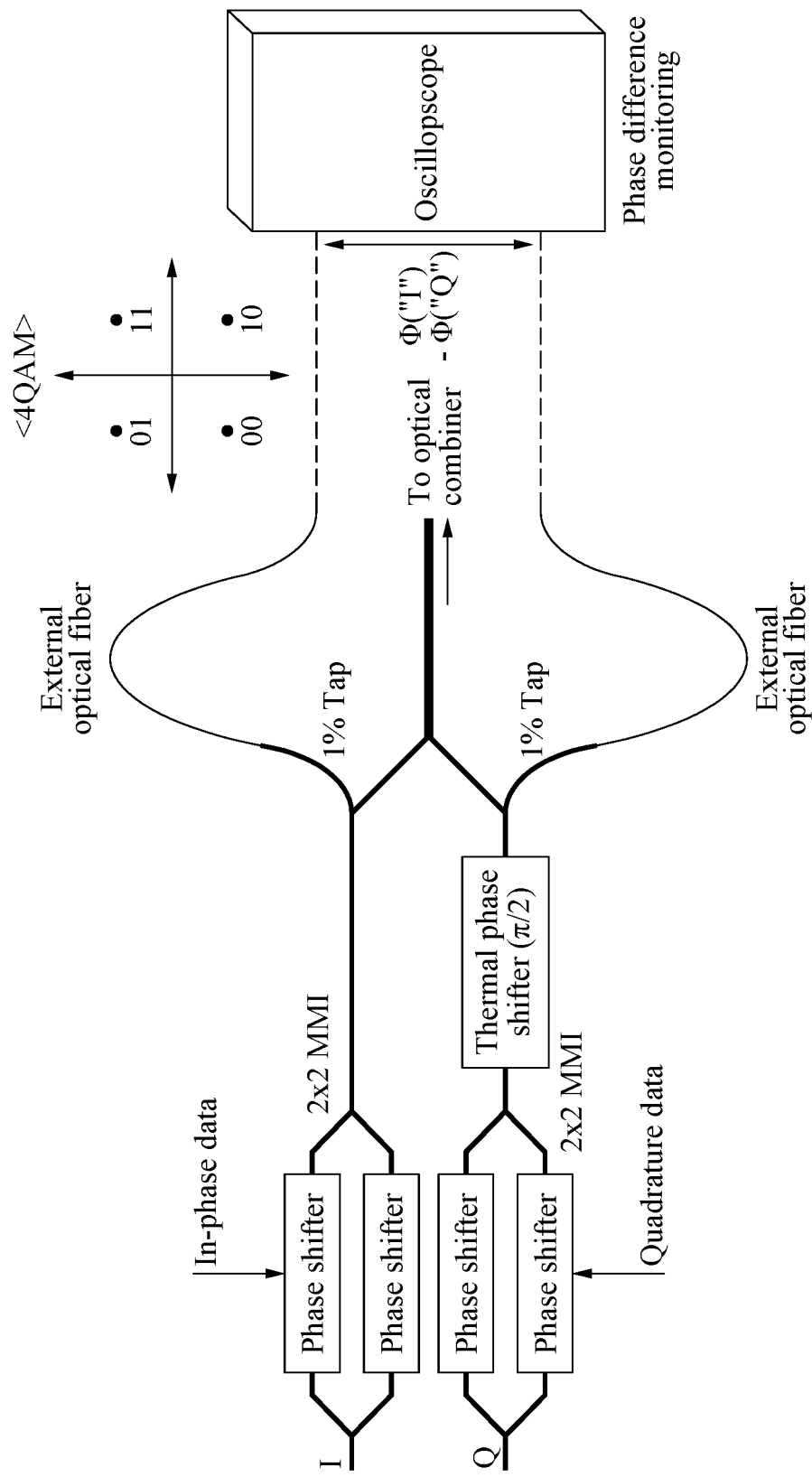
FIG. 4 illustrates a dual-parallel Mach-Zehnder interferometer-based IQ optical modulator to which a real-time IQ phase difference monitoring function is added according to an example embodiment.

FIG. 3 illustrates high-speed data modulation using an IQ (in-phase quadrature) optical modulator according to an example embodiment, and FIG. 4 illustrates a dual-parallel Mach-Zehnder interferometer-based IQ optical modulator using real-time IQ phase difference monitoring according to an example embodiment.

In the high rate data modulation unit 120, an in-phase quadrature (IQ) based optical modulator 122 in a dual-parallel Mach-Zehnder interferometer (hereinafter, MZI) structure as shown in FIG. 4 is proposed for high-speed data transmission in broadband short-range wireless communications. IQ signals are orthogonal to each other as shown in FIG. 3 and may thus be transmitted at the same time. For example, an I-channel (in-phase) signal and a Q-channel (quadrature) signal are two sine waves having the same frequency and a phase difference of 90 degrees. For example, the I-channel signal may correspond to a cosine waveform, and the Q-channel signal may correspond to a sine waveform.

That is, high rate data transmission may be enabled by transmitting one data by allowing two bits to carry the data. However, in actual implementation, it is not easy to precisely adjust the phase difference of the two MZIs constituting the IQ-based optical modulator 122 to 90 degrees. Thus, the performance such as the extinction ratio and modulation efficiency may degrade greatly, finally leading to failing in modulation to a designed maximum rate. In particular, at the board level, misalignment may deepen such issues, and it is not easy to find an optimal operating condition for IQ modulation. Thus, much time is consumed for finding the optimal parameter condition, and the reproducibility decreases.

The high rate data modulation unit 120 may minimize integrated circuit misalignment to solve such issues, and monitor the phase difference between the two MZI signals with 1% tap by connecting a 2×2 MMI or 99:1 coupler to each MZI output end and control the phase shifters 121 such that the phase difference of the two MZIs, which is the optimal modulation condition, is 90 degrees, thereby reducing the time consumed to optimize the parameter value and increasing the reproducibility. In addition, the method proposed herein may independently use dual MZIs even in an application field significantly requiring easy implementation, rather than in high-speed data transmission, thereby performing modulation in an NRZ manner with excellent bandwidth efficiency or in an RZ manner that extracts synchronization information from data.

Figure 5:
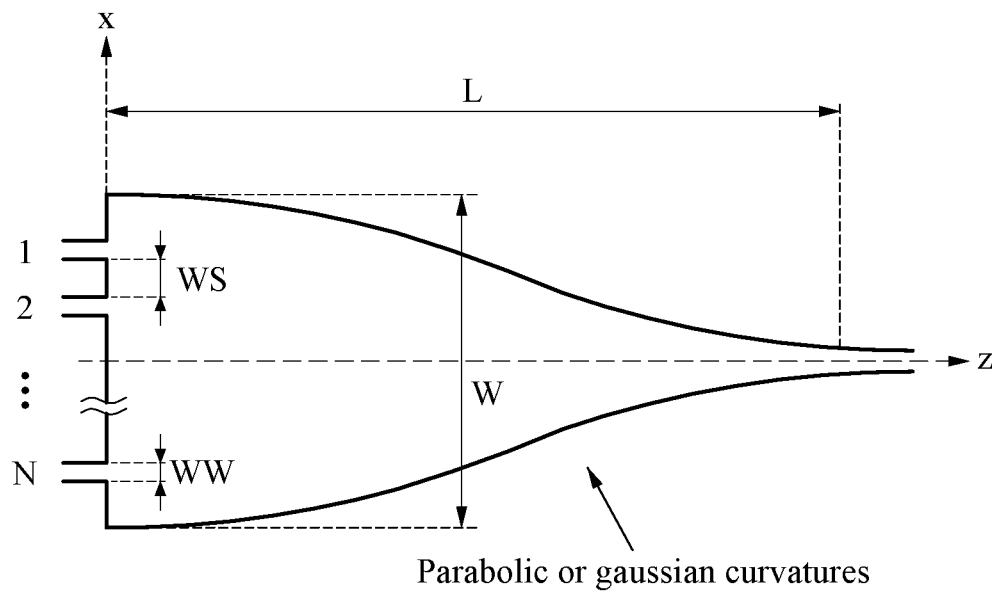
FIG. 5 illustrates an optical combiner in a nonlinear tapered structure for minimizing a coupling loss according to an example embodiment.
Figure 5:
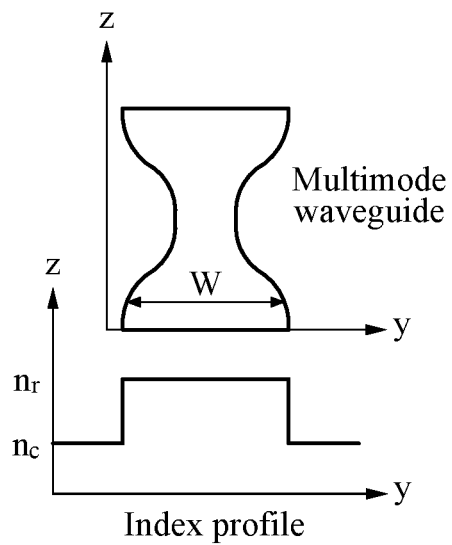

FIG. 5 illustrates an optical combiner in a nonlinear tapered structure according to an example embodiment.

An IQ signal having a resonant frequency of $(f_1+\Delta f)$ modulated according to data to be transmitted may be transmitted to the optical amplifier 131 having a gain curve in a C band, along with an optical signal having a resonant frequency of $f_1$ through the optical combiner 123. In general, an MMI coupler may be used for the silicon photonics-based optical combiner 123. More specifically, the MMI coupler structure may include an access waveguide that receives input signals from multiple ports at both ends and outputs signals through one output port, and a multimode waveguide that combines or distributes signals received from multiple ports to transmit the signals through one or more output ports.

In this case, in the present disclosure, a nonlinear tapered structure in the form of a parabolic or Gaussian curve may be applied to the MMI coupler. Since the nonlinear tapered structure may match the mode while more slowly changing a mode than a quadrangular or linear tapered structure, the nonlinear tapered structure may have a very small loss caused by back-reflection and also reduce a characteristic instability resulting from manufacturing process errors.

Figure 6:
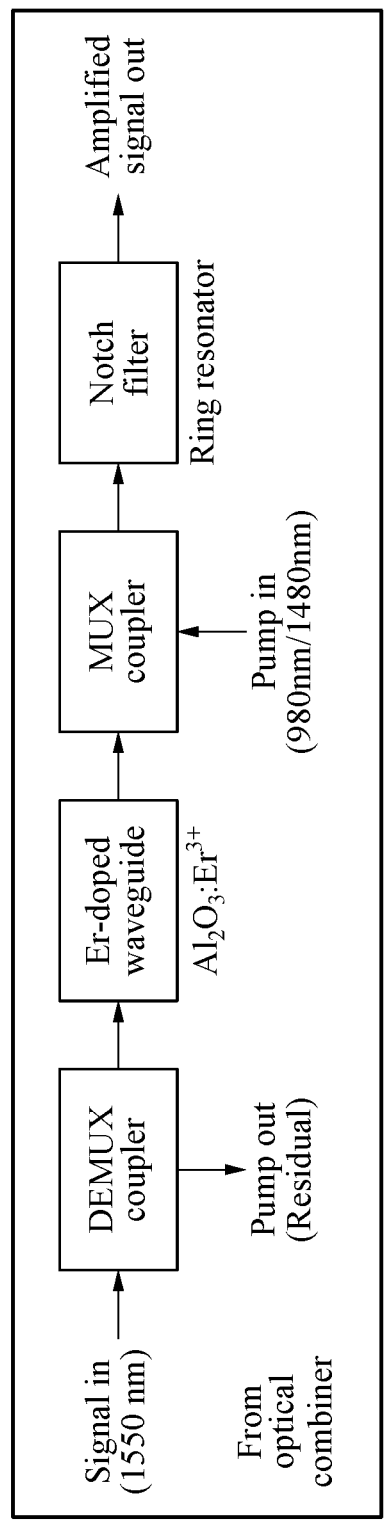
FIG. 6 illustrates a configuration of a low noise optical amplifier according to an example embodiment.

FIG. 6 illustrates a configuration of a low noise amplifier according to an example embodiment.

When the intensity of a signal output from the optical combiner 123 of the MMI coupler structure is very small, the signal may be amplified through the integrated optical amplifier 131. More specifically, the optical amplifier 131 may input and be amplified in an erbium-doped waveguide having a gain band at a wavelength of 1550 nanometers (nm) as a gain medium by pump signals with a MUX/DEMUX coupler, and then extract an amplified optical signal using a ring resonator. At this time, the pump signal may be pumped reversely to lower amplified spontaneous emission (ASE) noise of a gain spectrum and improve a noise figure (NF).

Figure 7:
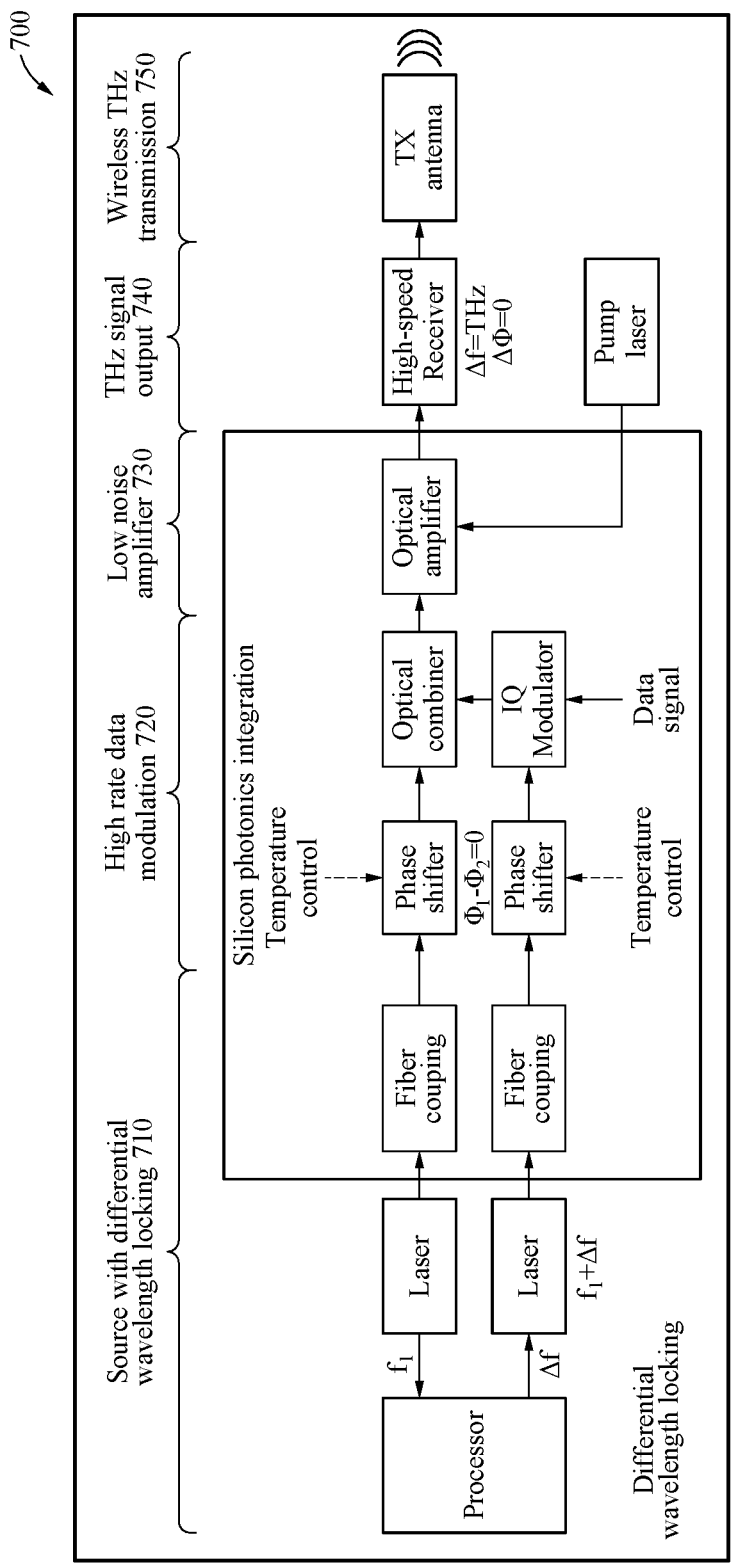
FIG. 7 illustrates a structure of a silicon photonics integration-based terahertz signal generation apparatus using two different light sources according to an example embodiment.

FIG. 7 illustrates a structure of a silicon photonics integration-based terahertz signal generation apparatus using two different light sources according to an example embodiment.

A silicon photonics integration-based terahertz signal generation apparatus 700 provided herein may be implemented by separating two light sources from integration, as shown in FIG. 7, according to the degree of integration difficulty. In this case, a phase-locked light source and low-loss coupling unit 710 may additionally include a phase locking device for controlling a phase of a second optical signal by feeding back a phase of a first optical signal for phase matching between the two light sources. At this time, when the optical signals output from the light sources and transmitted through optical fibers are allowed to be incident to a silicon photonics chip, the phase-locked light source and low-loss coupling unit 710 may perform grating coupler-based fiber coupling to increase the coupling efficiency. As another example, an existing general oscillation (free running)-based laser and an optical frequency comb may be placed outside and connected to the silicon photonics chip through a grating coupler.

The other elements such as a high rate data modulation unit 720, a low noise amplifier 730, a terahertz signal output unit 740, and a wireless THz transmission unit 750 may operate in the same manner as the corresponding elements included in the terahertz signal generation apparatus 100 of FIG. 1. Thus, a duplicate description will be omitted.

Figure 8:
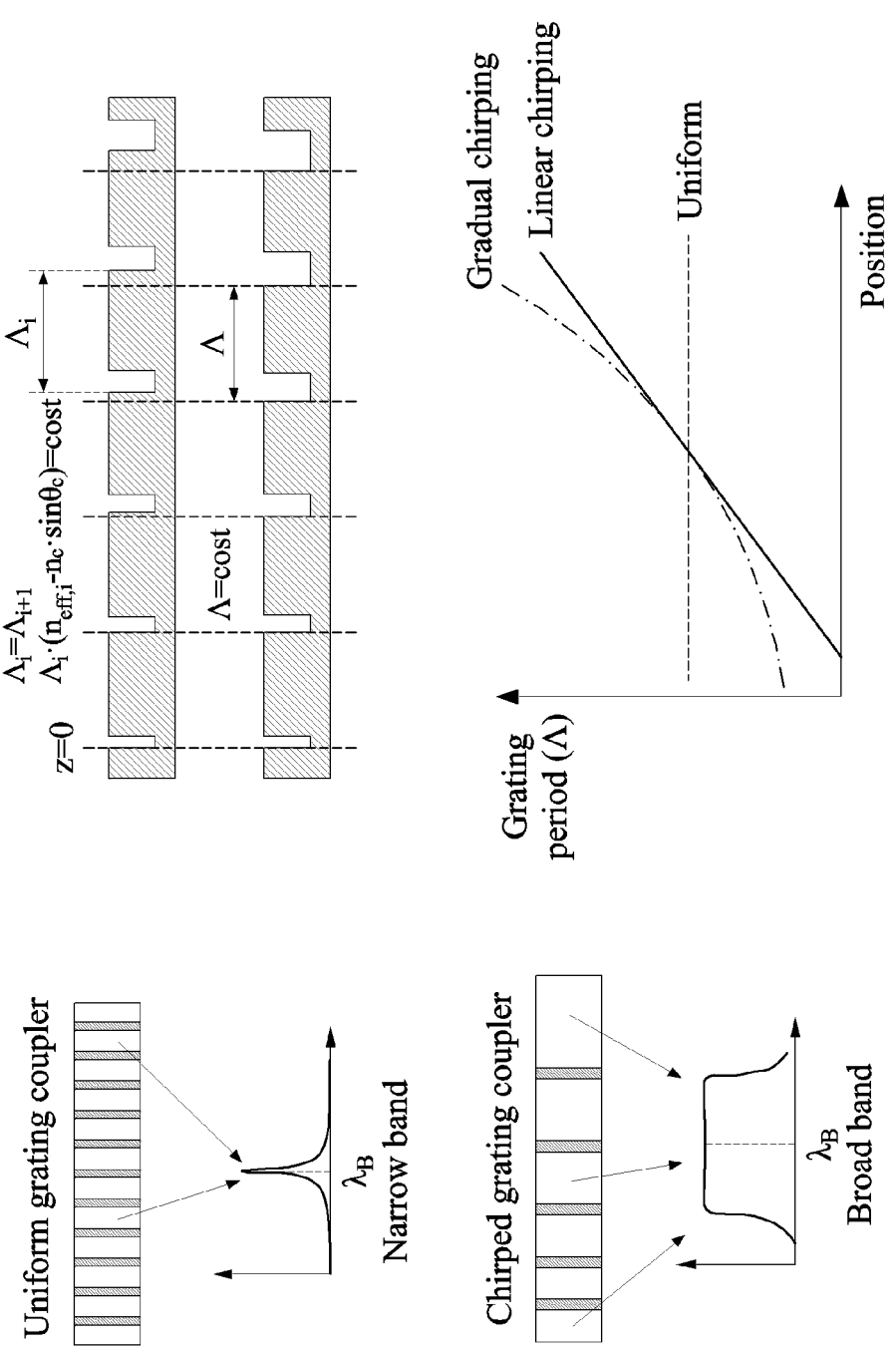
FIG. 8 illustrates a gradual chirping grating structure used for a phase-locked light source and coupling unit to improve a coupling efficiency according to an example embodiment.

FIG. 8 illustrates a gradual chirping grating structure used for a phase-locked light source and low-loss coupling unit according to an example embodiment.

The phase-locked light source and low-loss coupling unit 710 may apply a gradual chirping grating structure as shown in FIG. 8, to increase the coupling efficiency and lower a loss. More specifically, the phase-locked light source and low-loss coupling unit 710 may reduce a loss caused by mode mismatch and increase the coupling efficiency by using the gradual chirping grating structure in which a grating interval is not constant but rather gradually changed according to a distance. In addition, in order to improve price competitiveness according to the degree of integration difficulty, an external semiconductor optical amplifier (SOA) may be integrated as a hybrid instead of a silicon-based integrated erbium-doped waveguide amplifier (EDWA). In this case, a variable optical attenuator (VOA) for adjusting the input power of a high-speed receiver may be additionally disposed at an output end of the SOA.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A terahertz signal generation apparatus comprising:
   first and second resonators configured to respectively output an optical signal of a first resonant frequency and an optical signal of a second resonant frequency from an optical signal input through a gain medium;
   an optical modulator configured to optically modulate the output optical signal of the second resonant frequency;
   an optical combiner configured to combine the CW optical signal of the first resonant frequency and the modulated optical signal of the second resonant frequency; and
   a signal generator configured to generate a terahertz signal using heterodyne beating between the CW optical signal of the first resonant frequency and the modulated optical signal of the second resonant frequency,
   wherein the terahertz signal has a frequency corresponding to a difference between the first resonant frequency and the second resonant frequency,
   wherein the first resonant frequency and the second resonant frequency are monitored so that there is no phase difference,
   wherein:
   the optical modulator is in a dual-parallel Mach-Zehnder interferometer structure, and
   a phase difference between an I-channel (in-phase) signal and a Q-channel (quadrature) signal, which are outputs from the dual-parallel Mach-Zehnder interferometer structure, is monitored through a tap connected to a rear end of the dual-parallel Mach-Zehnder interferometer structure.

2. The terahertz signal generation apparatus of claim 1, wherein:
   each of the first and second resonators comprises a ring waveguide and a bus waveguide connected to the ring waveguide, and
   the ring waveguide included in each of the first and second resonators has an effective refractive index and a radius that are adjusted according to a resonant frequency of an optical signal to be generated.

3. The terahertz signal generation apparatus of claim 2, wherein:
   each of the first and second resonators further comprises a microheater, and
   center frequency values of optical signals output through the ring waveguide are finely adjusted through the microheater.

4. The terahertz signal generation apparatus of claim 1, wherein:
   the optical modulator comprises a phase shifter at a rear end of any one Mach-Zehnder interferometer in the dual-parallel Mach-Zehnder interferometer structure, and
   the phase shifter is controlled such that the phase difference between the I-channel (in-phase) signal and the Q-channel (quadrature) signal monitored through the tap is 90 degrees.

5. The terahertz signal generation apparatus of claim 1, wherein the optical combiner has a nonlinear tapered structure in the form of a parabolic or Gaussian curve.

6. A terahertz signal generation apparatus comprising:
   first and second fiber-optic couplers configured to respectively receive an optical signal of a first resonant frequency and an optical signal of a second resonant frequency through two different light sources;
   an optical modulator configured to optically modulate the optical signal of the second resonant frequency received through the second fiber-optic coupler;
   an optical combiner configured to combine the optical signal of the first resonant frequency received through the first fiber-optic coupler and the modulated optical signal of the second resonant frequency; and
   a signal generator configured to generate a terahertz signal using heterodyne beating between the CW optical signal of the first resonant frequency and the modulated optical signal of the second resonant frequency, wherein the two different light sources are monitored such that the optical signal of the first resonant frequency and the optical signal of the second resonant frequency are in phase through a phase locking device, wherein:

the optical modulator is in a dual-parallel Mach-Zehnder interferometer structure, and a phase difference between an I-channel (in-phase) signal and a Q-channel (quadrature) signal, which are outputs from the dual-parallel Mach-Zehnder interferometer structure, is monitored through a tap connected to a rear end of the dual-parallel Mach-Zehnder interferometer structure.

7. The terahertz signal generation apparatus of claim 6, wherein each of the first and second fiber-optic couplers has a gradual chirping grating structure in which a grating interval is changed according to a distance.

8. The terahertz signal generation apparatus of claim 6, wherein:

the optical modulator comprises a phase shifter at a rear end of any one Mach-Zehnder interferometer in the dual-parallel Mach-Zehnder interferometer structure, and the phase shifter is controlled such that the phase difference between the I-channel (in-phase) signal and the Q-channel (quadrature) signal monitored through the tap is 90 degrees.

9. The terahertz signal generation apparatus of claim 6, wherein the optical combiner has a nonlinear tapered structure in the form of a parabolic or Gaussian curve.

10. A terahertz signal generation method comprising:

outputting an optical signal of a first resonant frequency and an optical signal of a second resonant frequency from an optical signal input through a gain medium;

optically modulating the output optical signal of the second resonant frequency;

combining the CW optical signal of the first resonant frequency and the modulated optical signal of the second resonant frequency; and generating a terahertz signal using heterodyne beating between the CW optical signal of the first resonant frequency and the modulated optical signal of the second resonant frequency, wherein the first resonant frequency and the second resonant frequency are processed to have a predetermined frequency difference, wherein the optically modulating comprises monitoring a phase difference between an I-channel (in-phase) signal and a Q-channel (quadrature) signal, which are outputs from a dual-parallel Mach-Zehnder interferometer structure, through a tap connected to a rear end of the dual-parallel Mach-Zehnder interferometer structure in an optical modulator provided in the dual-parallel Mach-Zehnder interferometer structure.

11. The terahertz signal generation method of claim 10, wherein:

the outputting comprises outputting the optical signal of the first resonant frequency and the optical signal of the second resonant frequency through first and second resonators each comprising a ring waveguide and a bus waveguide connected to the ring waveguide, and the ring waveguide included in each of the first and second resonators has an effective refractive index and a radius that are adjusted according to a resonant frequency of an optical signal to be generated.

12. The terahertz signal generation method of claim 11, wherein:

each of the first and second resonators further comprises a microheater, and center frequency values of optical signals output through the ring waveguide are finely adjusted through the microheater.

13. The terahertz signal generation method of claim 10, wherein:

the optical modulator comprises a phase shifter at a rear end of any one Mach-Zehnder interferometer in the dual-parallel Mach-Zehnder interferometer structure, and the phase shifter is controlled such that the phase difference between the I-channel (in-phase) signal and the Q-channel (quadrature) signal monitored through the tap is 90 degrees.

14. A terahertz signal generation apparatus comprising:

first and second fiber-optic couplers configured to respectively receive an optical signal of a first resonant frequency and an optical signal of a second resonant frequency through two different light sources;

an optical modulator configured to optically modulate the optical signal of the second resonant frequency received through the second fiber-optic coupler;

an optical combiner configured to combine the optical signal of the first resonant frequency received through the first fiber-optic coupler and the modulated optical signal of the second resonant frequency; and a signal generator configured to generate a terahertz signal using heterodyne beating between the CW optical signal of the first resonant frequency and the modulated optical signal of the second resonant frequency, wherein the two different light sources are monitored such that the optical signal of the first resonant frequency and the optical signal of the second resonant frequency are in phase through a phase locking device, wherein each of the first and second fiber-optic couplers has a gradual chirping grating structure in which a grating interval is changed according to a distance.

* * * * *